(12) United States Patent
Flyntz

(10) Patent No.: US 7,134,022 B2
(45) Date of Patent: Nov. 7, 2006

(54) MULTI-LEVEL AND MULTI-CATEGORY DATA LABELING SYSTEM

(76) Inventor: Terence T. Flyntz, 7315 Billingsley Rd., Bryans Road, MD (US) 20616

( * ) Notice: Subject to any disclaimer, the term of this patent is extended or adjusted under 35 U.S.C. 154(b) by 727 days.

(21) Appl. No.: 10/195,836

(22) Filed: Jul. 16, 2002

(65) Prior Publication Data

US 2004/0015701 A1    Jan. 22, 2004

(51) Int. Cl.
*H04L 9/00* (2006.01)
*G06F 7/00* (2006.01)
*G06F 12/00* (2006.01)

(52) U.S. Cl. ............ 713/182; 707/100; 713/165; 713/166

(58) Field of Classification Search .......... None
See application file for complete search history.

(56) References Cited

U.S. PATENT DOCUMENTS 4,984,272 A * 1/1991 McIlroy et al. .......... 713/165
5,052,040 A * 9/1991 Preston et al. .......... 713/165
6,931,411 B1 * 8/2005 Babiskin et al. .......... 707/100
6,950,824 B1 * 9/2005 Babiskin et al. .......... 707/100

* cited by examiner

*Primary Examiner*—Kambiz Zand
*Assistant Examiner*—Laurel Lashley

(57) ABSTRACT

A security apparatus and method that provides Multi-Level and Multi-Category Mandatory Access Control (MAC) for controlling access to data within a database at the granularity of the data record. The access control mechanism is implemented so that it has no impact on the database. A standard labeling technology is used in which access to data is dependent on the label of the accessing entity and the label of the data being accessed. The data labels designate security access requirements for data within the database and are stored or generated in a label server that intercepts access requests to the database from remote users. User labels define user access rights and are retrieved or generated and linked to all access requests. The label server compares the user labels linked to an access request with the data label for the data requested to determine if user access is granted or denied.

19 Claims, 1 Drawing Sheet

MULTI-LEVEL AND MULTI-CATEGORY DATA LABELING SYSTEM

BACKGROUND OF THE INVENTION

This invention relates to a security apparatus and method that provides Multi-Level and Multi-Category Mandatory Access Control (MAC) for IPSec based Virtual Private Networks (VPNs) configured to secure Transport Control Protocol/Internet Protocol (TCP/IP) communications between a remote client and a database server.

DESCRIPTION OF THE RELEVANT ART

Prior art, multilevel network security systems include the use of security labels to control data in transit over a network based on its level of sensitivity; or to control access to data files within a personal computer; or to control operations performed on data in a database based on the labeled sensitivity level; or controlling access to computer system ports or sockets based on the labeled sensitivity levels. In all of these patents the label is directly attached to the data object, file, processing system, or data port to which access is being controlled. None of these patents have the capability to control network access to specific data objects within a database accessible via the network based on sensitivity labels for the stored data wherein the labels are not attached directly to the data or the processes that operate on the data. The requirement to directly connect the labels to the data or the ports or processes that are used to access and process the data requires the utilization of specialized hardware and software that must be embedded in either the data or the processing software and hardware that controls the data. This makes the use of this technology difficult with respect to controlling network access to the data in existing systems without significant modifications to the data structure and/or the hardware and software within the system.

SUMMARY OF THE INVENTION

The claimed invention provides a multilevel and multi-category network security solution that is transparent to the database structure and the hardware and software that are used to process the data. This is accomplished by using a data labeler system in which the data security labels are stored and processed outside the database but are utilized to control access to the data in the database.

The invention relies on a well known labeling technology in which access to data or a network location designated by an Internet Protocol (IP) address is dependent on the label of the accessing entity and the label of the data or location being accessed. Labels are digital representations of a binary word that are used in systems that implement mandatory access control in which access is based on a mandatory relationship between the label assigned to an accessing entity and the label assigned to the data being accessed. In mandatory access control systems labels can be hierarchical in which the label of the accessing entity has an assigned value that must be equal to or exceed the value of the label assigned to the data or location being accessed. This type of label is usually utilized for access based on security levels. Labels can also be based on specific access rights in which the label of the accessing entity must exactly match the label assigned to the data or location being accessed. This type of label is used for controlling access to a category of data as opposed to controlling access based on a security level.

The current invention addresses the problem of implementing multi-level and multi-category security in a legacy database by allowing data labels to be implemented in a separate server. This separate server, known as the Label Server, is used to link the data label to the data in the legacy database. As embodied and broadly described herein, the current invention allows access to a legacy database to be controlled based on a user's security clearance and/or data category access rights without modifying the database.

The user or accessor of the data at a remote user terminal would also have a client labeling system at the client terminal that would define the client's security clearance and/or data category access rights. This client labeling system would utilize information provided by the user that can be used to identify their clearance and category access rights. The client labeling system can consist of a software application or some combination of identification hardware and software such as a Smart Card and/or Biometric Identification System. The representation of the user label could be generated by the client labeling system and transmitted with a data request generated by the terminal user via the database application software on the remote client. Such a request would normally be transmitted directly to the database server located at a known IP Address. In the current invention the Data Label Database is located at the IP address that would normally be assigned to the database server. The database server is connected via a direct link to the Label Server that implements the data labels for the data in the database server. All data requests from the remote client are monitored and pre-processed by the Label Server by first extracting the representation of the user label. Depending on the configuration of the data representing the user label, it will either be directly used as the label or will be processed further to generate the actual user label.

The data request from the client terminal is passed on to the database server from the directly connected Label Server and the accessed data is returned to the Label Server. The accessed data is then processed to determine its security attributes from the processing of a specific field(s) in its data record or from some static security relationship that was pre-assigned to the data record and the data label in the data label database located in the Label Server.

If there is no pre-assigned security relationship, the Label Server will generate a label from the security attributes represented by specific field(s) within the data record. For example, data that is stored in a Federal Government Database that is owned by a private company is generally assigned a CAGE Code that identifies the company and possibly the subdivision that has the data ownership rights. This Cage Code can be used to generate a label that identifies access requirements based on the data ownership access rights of the company. Combinations of fields could be used to generate a label or a combination of label a classification label and category label that identifies more complex access requirements based on several attributes such as security classification and ownership access rights. An existing standard for such data classification and category labels is defined in Federal Information Processing Standard (FIPS) Publication 188, "Standard Security Label for Information Transfer".

The Label Server will compare the user label with the data label to determine if the accessed data can be transmitted to the client terminal or if access is terminated. This comparison process will compare both the security level label and the data category label of the data with the security clearance level label and data category access rights label portion of the user label. For access to be granted the security clearance level label must be equal to or exceed the security level label of the data and/or the data category access rights label must exactly match the data category label of the data. In the case of data without an assigned security level but with a category label, access is based on a comparison of the category labels only. Similarly, in the case of data without category labels but with a security level label, access is based on the security level labels. In those instances where data has no assigned label access will be assumed to be open to all requests from the client terminal.

The invention, as described, provides a transparent client-server access control system for controlling network access to a legacy database with multiple security level/category access requirements based on a remote users access rights and the access requirements or security attributes of the stored data. Such a system can operate as a transparent multi-level and multi-category access control system for IPSec based Virtual Private Network (VPN) systems. The VPN would protect the actual data transfer between the remote client terminal and the database server through IP authentication and data encryption. Actual data access via the VPN tunnel would be implemented by the Data Labeler System as described herein. The Data Labeler System would operate at the application layer of the TCP/IP Protocol Stack with the database application and would be entirely transparent to the IPSec VPN operating at the network layer of the TCP/IP Protocol Stack.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims. These include physical implementations of the multi-level and multi-category data labeling system method that can be easily applied to existing legacy data base systems.

DESCRIPTION OF THE DRAWINGS

The accompanying drawing, which is incorporated in and constitutes a part of the specification, illustrate a preferred embodiments of the invention, and together with the description serves to explain the principles of the invention.

DETAILED DESCRIPTION OF THE PREFERRED EMBODIMENTS

Figure 1:
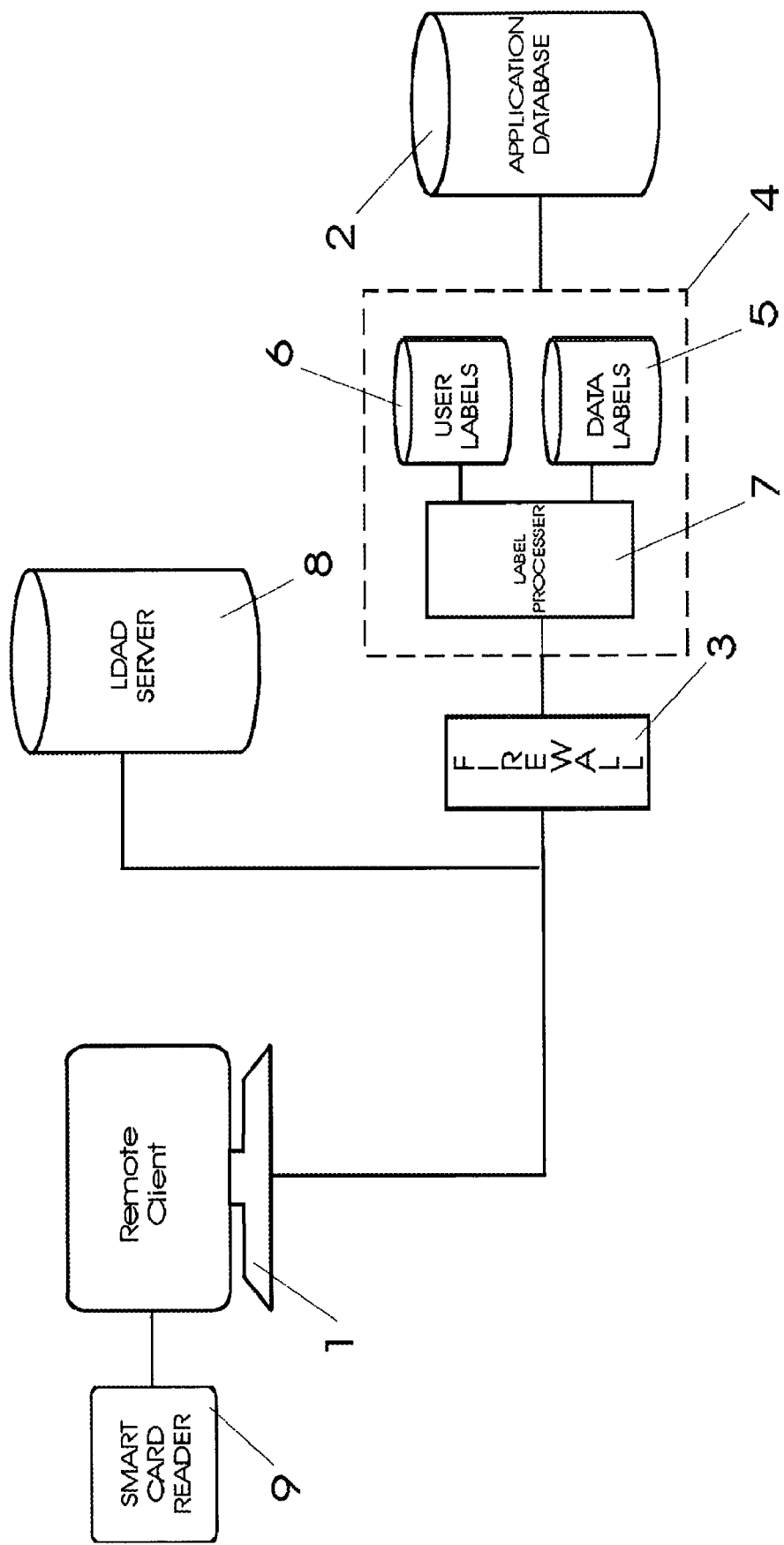
FIG. 1 is a block diagram of the multi-level and multi-category data labeling system according to the present invention.

Reference now is made in detail to the present preferred embodiments of the invention, examples of which are illustrated in the accompanying drawing.

As illustratively shown in FIG. 1, a multilevel and multi-category data labeling system is provided comprising a Remote Client 1 with a network interface to a Label Server 4 that is directly connected to a Database Server 2. The Remote Client 4 includes client labeling software that generates user labels from user identification data provided by the Smart Card Reader 9. Depending on the mode of operation of the Data Labeling System, user labels could also be stored within the Lightweight Directory Access Protocol (Server 8 or a User Label Database 6 within the Label Server 4. Data labels are either generated by the Label Processor 7 from the accessed data records within the Database Server 2 or are accessed directly by the Label Processor 7 from the Data Label Database 5. A Firewall 3 is shown to provide security protection for the Label Server and the Database Server.

There are several possible modes of operation for the Data Labeling System shown in FIG. 1 that utilize a subset of the depicted components. In a first mode of operation a user's security attributes consisting of a digital representation of their security clearance and/or data access category rights would be stored on their Smart Card or equivalent user token. The Smart Card would be read by the Smart Card Reader 9 which would provide this data to the client labeling software for conversion into a user label. To ensure that the user is actually the owner of the Smart Card an I&A process would be implemented by the client labeling software installed as an application on the Remote Client 1. The I&A process would require the user to enter a personal identification number (PIN) and password from the keyboard of the Remote Client 1 that matches the values stored on the Smart Card. Additional security could be provided by storing these values on the Smart Card as encrypted values that would be decrypted by the client labeling software within the Remote Client 1. An additional security option would be to replace the entry of a password with user biometric data such as a fingerprint representation read and verified by a fingerprint reader system installed on the Remote Client 1.

The user label can be any acceptable digital format as long as it supports the security attributes of potential users including the number of possible user security clearance levels and data access category rights. A user label format must also be consistent with the data label format assigned to the data stored within the database server. This would require the label format to also support the number of possible security levels and data categories for the data within the database server. It is also desirable for the label format to be a recognized standard so that it can be easily used by all remote clients. The FIPS 188 Publication defines a standard label format for label types that support up to 256 security levels and 65,535 data categories.

The generated user label is transmitted with a database access request such as Standard Query Language (SQL) Statements that would be generated by an SQL Client for accessing and retrieving data from a remote database. These SQL statements would be embedded in the communications between the Remote Client 1 and the Application Database 2 shown in FIG. 1. The communication would begin with the formation of the SQL statements by the SQL Client in response to a user generated data request. These SQL statements would be intercepted by the client labeling software and assigned a user label. This label would be inserted into the options field of the Internet Protocol (IP) Header for the Internet Protocol Version 4 (IPv4) TCP/IP datagram containing the SQL statements. The client labeling software would interface with the IP layer of the TCP/IP protocol stack via the socket interface available from the Remote Client Operating system. This socket interface would support the insertion of the label, the generation of the SQL datagram, and other required TCP/IP services such as the designation of the destination IP address which as shown in FIG. 1 as the Label Server. The Label Server is located at the IP address that would be otherwise be assigned to the Application Database 2.

When the datagram is received at the Label Server 4 shown in FIG. 1, the SQL statements will be extracted by the Label Processor 7 and passed to the Application Database 2 for processing the data request. The user label is extracted from the IP Header and stored by the Label Processor 7 for comparison with the data labels for the data that is retrieved from the Application Database 2. This retrieved data is sent from the Application Database 2 to the Label Server via a direct network connection through a dedicated line or VPN. When the retrieved data is received at the Label Server, it is immediately processed by the Label Processor 7 to first determine if said retrieved data has a pre-assigned data label that is stored in the Data Label Database 5. The Label Processor will compare a predetermined attribute of the retrieved data record with index data in the Data Label Database 5 to determine if there is a link or relationship between a pre-assigned data label and the retrieved data. If there is no pre-assigned data label the Label Processor 7 will utilize attributes of the accessed data record to directly generate a data label.

The Label Processor 7 will compare the stored user label with the stored or generated data label to determine if the accessed data can be transmitted to the Remote Client or if access will be denied. In the case of data labels that have a security level component the user label must have a clearance level equal to or above the security level of the data label for access to be allowed. For data labels with a category component the user label must have the exact same category as the data label for access to be allowed. In those instances where the data label has both a security level and category component both of the above conditions must be met for data access to be allowed.

If data access is allowed the Label Processor 7 will transmit the retrieved data to the Remote Client 1 in a datagram with an IP Header that includes the destination address of the Remote Client 1. The required TCP/IP services will be provided via the socket interface of the Label Server 4 operating system. If data access is denied a standard denial of access message will be sent to the Remote Client 1 from the Label Server 4.

There are several possible variations on the first mode of operation. One of these would be to use an LDAP Server to store the user labels instead of a Smart Card. In this second mode of operation the user could utilize a similar I&A procedure as was used in the first mode of operation to authenticate to the Remote Client 1 in FIG. 1. The encrypted I&A data stored on the user's Smart Card will be read by the Smart Card Reader 9 of FIG. 1 and decrypted by the client labeling software as was done in the first mode of operation. In addition, the decrypted I&A data will also be compared with the I&A data entered by the user from the Remote Client 1 keyboard in the same manner as the first mode of operation. If the comparison authenticates the user the I&A data will be utilized by the client labeling software to authenticate the user to the LDAP Server 8 of FIG. 1. This is done by using the socket interface of the Remote Client Operating System and the services provided by the TCP/IP Stack to generate a datagram with the user I&A data and a data retrieval request for the user label matching that I&A data. The LDAP Server 8 of FIG. 1 will respond by sending the requested user label to the Remote Client 1. At this point the retrieved label will be processed by the client labeling software in the same manner as it was when it was read from the user Smart Card in the first mode of operation.

The LDAP Server 8 of FIG. 1 provides an alternative source of label data. It could also provide the primary source for those users who do not have a Smart Card. Such users could authenticate themselves through the entry of a PIN via the keyboard of the Remote Client 1 and a password or biometric data via the keyboard or a biometric sensor, respectively. This I&A data would then be compared by the client labeling software with the known user data stored within the Remote Client 1. Once the authentication was successfully completed the I&A data would be used to authenticate the user to the LDAP Server and retrieve the user label as described above.

A third mode of operation completely eliminates the need for any special client labeling software at the Remote Client 1 of FIG. 1. In this mode of operation the database application software would implement all required user authentication using the mechanism it normally uses to authenticate to the Application Database 2. While this mechanism varies with each Database Management System, all database applications have a procedure for authenticating a user at a Remote Client 1 to the Application Database that utilizes a form of digitized user identification data. In the Data Labeling System of FIG. 1, the user identification data and the database access request would be sent to the Label Server 4 since it is at the IP address that would normally be used by the Application Database 2. The Label Processor 7 within the Label Server 4 will utilize the user identification data to access and retrieve a user label from the User Label Database 6. This user label will be stored for comparison with the data label that results from the database access request.

The data retrieved from the Application Database 2 of FIG. 1 is processed in the same manner as it was in the first mode of operation. If there is no pre-assigned data label, the Label Processor 7 will utilize attributes of the accessed data record to generate a data label. The Label Processor 7 will then compare the stored user label with the data label to determine if the accessed data can be transmitted to the Remote Client or if access will be denied. If access is allowed the retrieved data will be sent by the Label Server 4 to the Remote Client 1. A denial of access message will be sent from the Label Server 4 to the Remote Client 1 if access is denied.

The third mode of operation of the Data Labeling System of FIG. 1 is the easiest to implement and maintain since there is no requirement for any special client based software with a socket interface. In addition, both the data labels and user labels are stored within a single server. This allows the administration of all labels to be centralized at a single location. In the other modes of operation user labels and data labels would need to administered separately which could considerably complicate the administration process.

In the first and second modes of operation, data labels are sent from the FIG. 1 Remote Client to the Label Server 4 as part of the options field of the IPv4 Header. This insertion of the label requires an acceptable socket interface between the Application Layer and the IP Layer of the Operating Systems TCP/IP stack and a known means for the application to access this interface. In most operating systems this interface is accessible because the interface is either in the public domain as is the case for LINUX and UNIX or the operating system provides an available interface mechanism to access this interface such as is provided by Windows Raw Sockets. The utilization of a socket interface may be very difficult in some older operating systems which would make the utilization of the first and second modes of operation more complicated. This problem is eliminated by the third mode of operation since there is no requirement to insert the label in the IPv4 Header and all interfaces with the TCP/IP Protocol Stack are embedded in the database application software.

All of the modes of operation of the Data Labeling System operate at the Application Layer of the TCP/IP Protocol Stack. This is important since it allows the Data Labeling System to supplement and be supplemented by the operation of any IPSec based VPN in a transparent manner since the VPN operates at the lower level Network Layer of the TCP/IP Protocol Stack. In operation the IPSec based VPN would essentially create a secure tunnel between the IP addresses of the Remote Client 1 and the Label Server 4 of the FIG. 1 Data Labeling System. The tunnel would consist of the authentication of the Remote Client IP to the Data Label Sever IP and the encryption of all data transferred between these IPs by any application on either the Data Label Sever 4 or the Remote Client 1. Once this secure tunnel is established the operation of the database and data labeling applications would operate through the VPN tunnel in a manner that is entirely independent and transparent to the VPN. This would allow the VPN to utilize the multi-level and multi-category access control capabilities of the Data Labeling System. In return the Data labeling System would gain the security of having absolute authentication of the Remote Client 1 and the Label Server 4 and the secure encryption of all data transferred between the Remote Client 1 and the Label Server 4. Communications between the Data Label Sever 4 and the Application Database 2 would be secured by the Firewall 3 of FIG. 1 and/or a separate VPN between the Label Server 4 and the Application Database 2.

It will be apparent to those skilled in the art that various modifications can be made to the multi-level and multi-category data labeling system and method of the instant invention without departing from the scope or spirit of the invention. It is intended that the present invention cover modifications and variations of the multi-level and multi-category data labeling system and method provided they come within the scope of the appended claims and their equivalents.

I claim:

1. A mandatory access control system for controlling user access via a network from a client database terminal to a database within a database server, said access control system located within a label server located in the network path between said client database terminal and said database server and comprising:

a user label database within said label server that stores user labels that define a binary word representing and defining the security attributes of users who logon to the client database terminal for authentication by the database server with identification and authentication data that is sent from said client database terminal with a data retrieval request;

a data label database within said label server that stores both data labels consisting of a binary word representing and defining the access requirements for data stored in said database server and index data that links the stored data label to specific data records in said database server based on a pre-assigned relationship between the data record retrieved from the database server and the data label stored in the data label database;

a label processor within said label server that is connected to said data label database and said user label data base and intercepts any data requests from the client database terminal and extracts the user identification and authentication data sent with the data request, said label processor converting said identification and authentication data into a user label and passing on the data request with said identification and authentication data to the database server for authentication against stored identification and authentication data and if the authentication is successful, intercepting any data record retrieved by said database server in response to said data request, said label processor first determining if there is index data in the data label database that links a stored pre-assigned data label to the retrieved data record and if there is linking index data, said label processor retrieving the pre-assigned data label and if there is no linking index data, said label processor generating a data label for the retrieved data from the security attributes of the retrieved data record and comparing the pre-assigned or generated data label with the user label and using the results of the comparison to determine if the retrieved data will be sent to said client database terminal or if said label processor will instead terminate the retrieved data and send an access denied message to said client database terminal.

2. A mandatory access control system for controlling user access via a network connection to a database within a database server accessible via the network connection comprising:

a client database terminal with a security program of instructions executable by said user database terminal located at said network connection that accepts user identification and authentication data via a user interface with said user database terminal to authenticate a user and then converts said user identification and authentication data into a user label consisting of a binary word representing the security attributes of a user, said user label being inserted into the protocol header of data request communications packets generated by the client database terminal that are sent via said network connection to a label server;

a data label database within said label server that stores both the data label, consisting of a binary word representing and defining the access requirements for data stored in said database server, and index data that links the stored data label to specific data records in said database server based on a pre-assigned relationship between the data record retrieved from the database server and the data label stored in the data label database;

a label processor within said label server that is connected to said data label database and intercepts any data request communications packets from the client database terminal and extracts the user label from the protocol header of said data request communications packets, said label processor passing on the data request communications packets to the database server and intercepting any data record retrieved by said database server in response to said data request, said label processor first determining if there is index data in the data label database that links a stored pre-assigned data label to the retrieved data record and if there is linking index data, said label processor retrieving the pre-assigned data label and if there is no linking index data, said label processor generating a data label for the retrieved data from the security attributes of the retrieved data record and comparing the pre-assigned or generated data label with the user label and using the results of the comparison to determine if the retrieved data will be sent to said client database terminal or if said label processor will instead terminate the retrieved data and send an access denied message to said client database terminal.

3. A mandatory access control system for controlling user access via a network connection to a database within a database server accessible via the network connection comprising:

a client database terminal with a security program of instructions executable by said client database terminal located at said network connection that accepts user identification and authentication data via a user interface with said client database terminal, said client database terminal sending the identification and authentication data to a directory access protocol server to access and retrieve a user data label stored within said directory access protocol server, said user label consisting of a binary word representing the security attributes of a user being inserted by said client database terminal into the protocol header of data request communications packets generated by said client database terminal that are sent via said network connection to a label server;

a user label database within a directory access protocol server that stores user labels that define a binary word representing and defining the security attributes of users who logon to the client database terminal with identification and authentication data that is sent from said client database terminal to said directory access protocol within label request communications packets;

a data label database within said label server that stores both data labels consisting of a binary word representing and defining the access requirements for data stored in said database server and index data that links the stored data label to specific data records in said database server based on a pre-assigned relationship between the data record retrieved from the database server and the data label stored in the data label database;

a label processor within said label server that is connected to said data label database and intercepts any data request communications packets from the client database terminal and extracts the user label from the protocol header of said data request communications packets, said label processor passing on the data request communications packets to the database server and intercepting any data record retrieved by said database server in response to said data request, said label processor first determining if there is index data in the data label database that links a stored pre-assigned data label to the retrieved data record and if there is linking index data, said label processor retrieving the pre-assigned data label and if there is no linking index data, said label processor generating a data label for the retrieved data from the security attributes of the retrieved data record and comparing the pre-assigned or generated data label with the user label and using the results of the comparison to determine if the retrieved data will be sent to said client database terminal or if said label processor will instead terminate the retrieved data and send an access denied message to said client database terminal.

4. The mandatory access control system as set forth in claims 1, 2, or 3 providing multi-level access control with said security attributes of user labels and said access requirements of data labels being based on security level values such that the comparison of user labels and data labels performed by the label processor requires the binary word representing said security attributes of the user label to be at a value that is equal to or above the value of the binary word representing said requirements of the data label as a condition for said retrieved data to be sent by said label processor to the client database terminal.

5. The mandatory access control system as set forth in claims 1, 2, or 3, providing multi-category access control with said security attributes of user labels and said access requirements of data labels being based on a unique category value such that the comparison of user labels and data labels performed by the label processor requires the binary word representing said security attributes of the user label to be an exact match with the binary word representing said access requirements of the data label as a condition for said retrieved data to be sent by said label processor to the client database terminal.

6. The mandatory access control system as set forth in claims 1, 2, or 3, providing both multi-level and multi-category access control with said security attributes of user labels and said access requirements of data labels being based on both security level values and unique category values such that the comparison of user labels and data labels performed by the label processor requires the binary word representing said security attributes of the user label to be at a security level value that is equal to or above the security level value of the binary word representing said access requirements of the data label and said security attributes of said user label be at a category value that is an exact match with the category value of the binary word representing said access requirements of the data label as a condition for said retrieved data to be sent by said label processor to the client database terminal.

7. The mandatory access control system as set forth in claims 1, 2, or 3 within which the network path between said client database terminal and said label server is comprised of a wide area network or internet and the network path between the label server and the database server is a direct local area network with the network path said client database terminal and said label server is protected by a virtual private network that is independent of said mandatory access control system and provides authentication between said client database terminal and said label server and encrypts all data sent between said client database terminal and said label server.

8. The mandatory access control system as set forth in claims 1, 2, or 3, with the direct local network path between said label server and said database server being protected by a virtual private network that is independent of said mandatory access control system and provides authentication between said label server and said database server and encrypts all data sent between said label server and said database server.

9. The mandatory access control system as set forth in claim 2 with the user interface with the client database terminal being comprised of a secure token reader and a keyboard with said secure token reader storing said user identification and authentication data and said user labels with said user identification data being also input from said keyboard interface and compared by said client database terminal with the identification and authentication data read by said token reader and allowing access to said client database terminal only if there is an exact match.

10. The mandatory access control system as set forth in claim 3 with the user interface with the client database terminal being comprised of a secure token reader and a keyboard with said secure token reader storing said user identification and authentication data with said user identification data being also input from said keyboard interface and compared by said client database terminal with the identification and authentication data read by said token reader and allowing access to said client database terminal only if there is an exact match.

11. The mandatory access control system as set forth in claims 9 or 10 with said secure token reader being comprised of a smart card reader.

12. A method for providing mandatory access control to the data in a database server from a client database terminal using a label server consisting of a user label database, data label database, and label processor that is in the network path between the client database terminal and the database server, said method comprising the steps of:

generating data requests from the client database terminal to the database server that are based on user input that includes user identification and authentication data;

sending the data request from the client database terminal to the database server via the network path;

intercepting with the label server any data requests from the client database terminal via the network path to the database server;

extracting the user identification and authentication data sent with the data request with the label processor within the label server;

retrieving with the label processor from the user label database a user label that consists of a binary word representing and defining the security attributes of users that is linked to the extracted user identification and authentication data;

sending the data request with said identification and authentication data from the label server to the database server via the network path;

authenticating the user at the database server by matching the received user identification and authentication data with identification and authentication data stored at the database server;

denying user access to the requested data if authentication is unsuccessful at the database server;

processing the data request at the database server if authentication is successfully completed by retrieving the requested data from the database and sending it to the client database terminal via the network path with the label server;

intercepting with the label processor any data record sent by the database terminal to the client database terminal via the network path in response to the data request;

determining with the label processor if there is index data in the data label database that links a stored pre-assigned data label to the intercepted data record;

retrieving from the data label database with the label processor if there is linking index data, the pre-assigned data label consisting of a binary word representing and defining the access requirements for data stored in the database server;

generating with the label processor if there is no linking index data a data label from the security attributes of the intercepted data record said label consisting of a binary word representing and defining the access requirements for data stored in the database server;

comparing with the label processor the pre-assigned or generated data label and the user label;

sending the intercepted data record from the label processor to the client database terminal if the results of the comparison indicates the user has access rights to the intercepted data record;

sending a denial of access message from the label processor to the client database terminal if the results of the comparison indicates the user does not have access rights to the intercepted data record.

13. A method for providing mandatory access control to the data in a database server from a client database terminal that includes a Smart Token Reader using a label server consisting of a data label database and label processor that is in the network path between the client database terminal and the database server, said method comprising the steps of:

accepting user identification and authentication data entered by the user at the client database terminal;

accepting user identification and authentication data from a user smart token via a smart token reader connected to the client database terminal;

comparing at the client database terminal the identification and authentication data entered by the user with the identification and authentication data read with the smart token reader;

terminating the user session at the client database terminal if the comparison is unsuccessful;

reading a user label, consisting of a binary word representing the security attributes of a user, from the user smart token with the client database terminal smart token reader if the comparison is successful;

generating data request communications packets at the client database terminal that include the user label inserted into the protocol header of the data request communications packets;

sending the data request communications packets from the client database terminal to the database server via the network path;

intercepting with the label server any data request communications packets from the client database terminal via the network path to the database server;

extracting with the label processor within the label server, the user label from the protocol header of the data request communications packets;

sending the data request from the label server to the database server via the network path;

processing the data request at the database server by retrieving the requested data from the database and sending it to the client database terminal via the network path with the label server;

intercepting with the label processor any data record sent by the database terminal to the client database terminal via the network path in response to the data request;

determining with the label processor if there is index data in the data label database that links a stored pre-assigned data label to the intercepted data record;

retrieving the pre-assigned data label from the data label database with the label processor if there is linking index data, said label consisting of a binary word representing and defining the access requirements for data stored in the database server;

generating with the label processor, if there is no linking index data, a data label from the security attributes of the intercepted data record, said label consisting of a binary word representing and defining the access requirements for data stored in the database server;

comparing with the label processor the pre-assigned or generated data label and the user label;

sending the intercepted data record from the label processor to the client database terminal if the results of the comparison indicates the user has access rights to the intercepted data record;

sending a denial of access message from the label processor to the client database terminal if the results of the comparison indicates the user does not have access rights to the intercepted data record.

14. A method for providing mandatory access control to the data in a database server from a client database terminal using a directory access protocol server storing user labels and a label server consisting of a data label database and label processor that is in the network path between the client database terminal and the database server, said method comprising the steps of:

accepting user identification and authentication data entered by the user at the client database terminal;

sending the user identification and authentication data from the client database terminal to a directory access protocol server via a network connection;

retrieving with the directory access protocol server a stored user label linked to the received user identification and authentication data, said label consisting of a binary word representing and defining the security attributes of users;

sending the retrieved user label to the client database terminal via a network connection;

generating data request communications packets at the client database terminal that include the user label inserted into the protocol header of the data request communications packets;

sending the data request communications packets from the client database terminal to the database server via the network path;

intercepting with the label server any data request communications packets from the client database terminal via the network path to the database server;

extracting with the label processor within the label server, the user label from the protocol header of the data request communications packets;

sending the data request from the label server to the database server via the network path;

processing the data request at the database server by retrieving the requested data from the database and sending it to the client database terminal via the network path with the label server;

intercepting with the label processor any data record sent by the database terminal to the client database terminal via the network path in response to the data request;

determining with the label processor if there is index data in the data label database that links a stored pre-assigned data label to the intercepted data record;

retrieving the pre-assigned data label from the data label database with the label processor if there is linking index data, said label consisting of a binary word representing and defining the access requirements for data stored in the database server;

generating with the label processor, if there is no linking index data, a data label from the security attributes of the intercepted data record, said label consisting of a binary word representing and defining the access requirements for data stored in the database server;

comparing with the label processor the pre-assigned or generated data label and the user label;

sending the intercepted data record from the label processor to the client database terminal if the results of the comparison indicates the user has access rights to the intercepted data record;

sending a denial of access message from the label processor to the client database terminal if the results of the comparison indicates the user does not have access rights to the intercepted data record.

15. The method as set forth in claims 12, 13, or 14 in which the network path between said client database terminal and said label server is comprised of a wide area network or internet, said network path being protected by a virtual private network that provides authentication between the client database terminal and the label server and encrypts all communication packets sent between the client database terminal and the label server.

16. The method as set forth in claims 12, 13, or 14 for providing multi-level access control by designating the security attributes of user labels and the access requirements of data labels to be based on security level values such that said comparison of user labels and data labels performed by the label processor requires the binary word representing said security attributes of the user label to be at a value that is equal to or above the value of the binary word representing said access requirements of the data label as a condition for a user having access rights to said data retrieved from the database server.

17. The method as set forth in claims 12, 13, or 14, providing multi-category access control by designating the security attributes of user labels and said access requirements of data labels to be a unique category value such that the comparison of user labels and data labels performed by the label processor requires the binary word representing said security attributes of the user label to be an exact match with the binary word representing said access requirements of the data label as a condition for a user having access rights to said data retrieved from the database server.

18. The method as set forth in claims 12, 13, or 14, providing both multi-level and multi-category access control by designating the security attributes of user labels and said access requirements of data labels to be based on both security level values and unique category values such that the comparison of user labels and data labels performed by the label processor requires the binary word representing said security attributes of the user label to be at a security level value that is equal to or above the security level value of the binary word representing said access requirements of the data label and said security attributes of said user label be at a category value that is an exact match with the category value of the binary word representing said access requirements of the data label as a condition for a user having access rights to said data retrieved from the database server.

19. The method as set forth in claim 13 in which said secure token reader is comprised of a smart card reader.

* * * * *